United States Patent
Li

(10) Patent No.: US 6,452,438 B1
(45) Date of Patent: Sep. 17, 2002

(54) TRIPLE WELL NO BODY EFFECT NEGATIVE CHARGE PUMP

(75) Inventor: Bo Li, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 53 days.

(21) Appl. No.: 09/751,695

(22) Filed: Dec. 28, 2000

(51) Int. Cl.$^7$ ................................ G05F 1/10
(52) U.S. Cl. ...................................... 327/536
(58) Field of Search ......................... 327/530, 534, 327/535, 536, 537

(56) References Cited

U.S. PATENT DOCUMENTS 6,175,264 B1 * 1/2001 Jinbo ........................... 327/534
6,292,048 B1 * 9/2001 Li ................................. 327/536
6,373,324 B2 * 4/2002 Li et al. ...................... 327/536

* cited by examiner

Primary Examiner—Jeffrey Zweizig
(74) Attorney, Agent, or Firm—Peter Law

(57) ABSTRACT

The negative charge pump of one embodiment comprises an N type switching device to transfer negative charge from its source terminal to its drain terminal. A boot capacitor is coupled to a control terminal of the switching device and forms a boot node between the capacitor and control terminal, boot capacitor to increase a voltage on the boot node. The pump comprises a pull-up device coupled to the switching device, the pull-up device to selectively discharge the boot node. The pump comprises an N type control device coupled to the pull-up device, the control device to selectively enable and disable the pull-up device. The pump comprises an N type pull-down device coupled to the switch device, the pull-up device to selectively precharge the boot node. The pump comprises a pair of N type well biasices coupled to substrate terminals of the switching, pull-up, control, and pull-down devices.

29 Claims, 6 Drawing Sheets

US 6,452,438 B1

TRIPLE WELL NO BODY EFFECT NEGATIVE CHARGE PUMP

FIELD OF THE INVENTION

The present invention relates generally to the field of computers and computer systems. More particularly, the present invention relates to a triple well no body effect negative charge pump.

BACKGROUND OF THE INVENTION

Many of today's computing applications such as cellular phones, digital cameras, and personal computers, use nonvolatile memories to store data or code. Nonvolatility is advantageous because it allows the computing system to retain its data and code even when power is removed from the computing system. Thus if the system is turned off or if there is a power failure, there is no loss of code or data.

One example of a nonvolatile memory device is the flash Electrically Erasable Programmable Read-only Memory (flash EEPROM or flash memory). Flash memory can be programmed by the user, and once programmed, the flash memory retains its data until the memory is erased. Electrical erasure of the flash memory erases the contents of the memory of the device in one relatively rapid operation. The flash memory may then be programmed with new code or data.

Flash memories have been used in portable computers and similar circuitry as both read only memory and as long term storage which may be both read and written. However, the tendency has been to reduce the power requirements of such portable computers to make systems lighter and to increase the length of use between recharging. This has required that the voltage potentials available to program the flash memory arrays be reduced. Flash memories must be able to operate in systems where a VCC supply voltage of 5V, 3V, or an even smaller voltage is available to circuit components.

However, performing program and erase operations in flash memory components requires that greater voltage than that supplied to the component be applied to the flash memory cells. For example, an erase operation may require that approximately −10.5V be applied to a memory cell. In order to achieve this voltage, a charge pump circuit is required in the flash memory component. A negative charge pump creates a negative voltage sufficient for erase operations. The charge pump must also be able to deliver sufficient current at the required voltage levels.

Furthermore, as the electronic applications and devices that use integrated circuit components move to lower and lower power, the flash memory components in these applications also have to be more power efficient. One possible area for optimization is the charge pump circuitry.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for a triple well no body effect negative charge pump is disclosed. The embodiments described herein are described in the context of a memory, but are not so limited. Although the following embodiments are described with reference to flash memory, other embodiments are applicable to other integrated circuits or logic devices. The same techniques and teachings of the present invention can easily be applied to other types of circuits or semiconductor devices that use charge pumps.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Embodiments of the present invention relate to a triple well no body effect NMOS negative charge pump. Current negative charge pumps are created with P type transistor devices. With the use of a triple well semiconductor manufacturing process, negative charge pumps can be implemented with N type transistors devices also. The negative charge pump embodiments described below use triple well N channel high mobility transistor devices with the deep N wells grounded, instead of regular P channel low mobility transistor devices. The parasitic bipolar transistors are avoided such that the charge transfer occurs mainly in the channel of the transistor device. In one embodiment, the triple N channel devices provide twice the mobility of regular P channel devices. P type transistor devices typically have a strong body effect, which negatively impacts the mobility. With the increased mobility of the N type devices, embodiments of the negative charge pumps using N type transistors can be more efficient and more current can be available.

Figure 1:
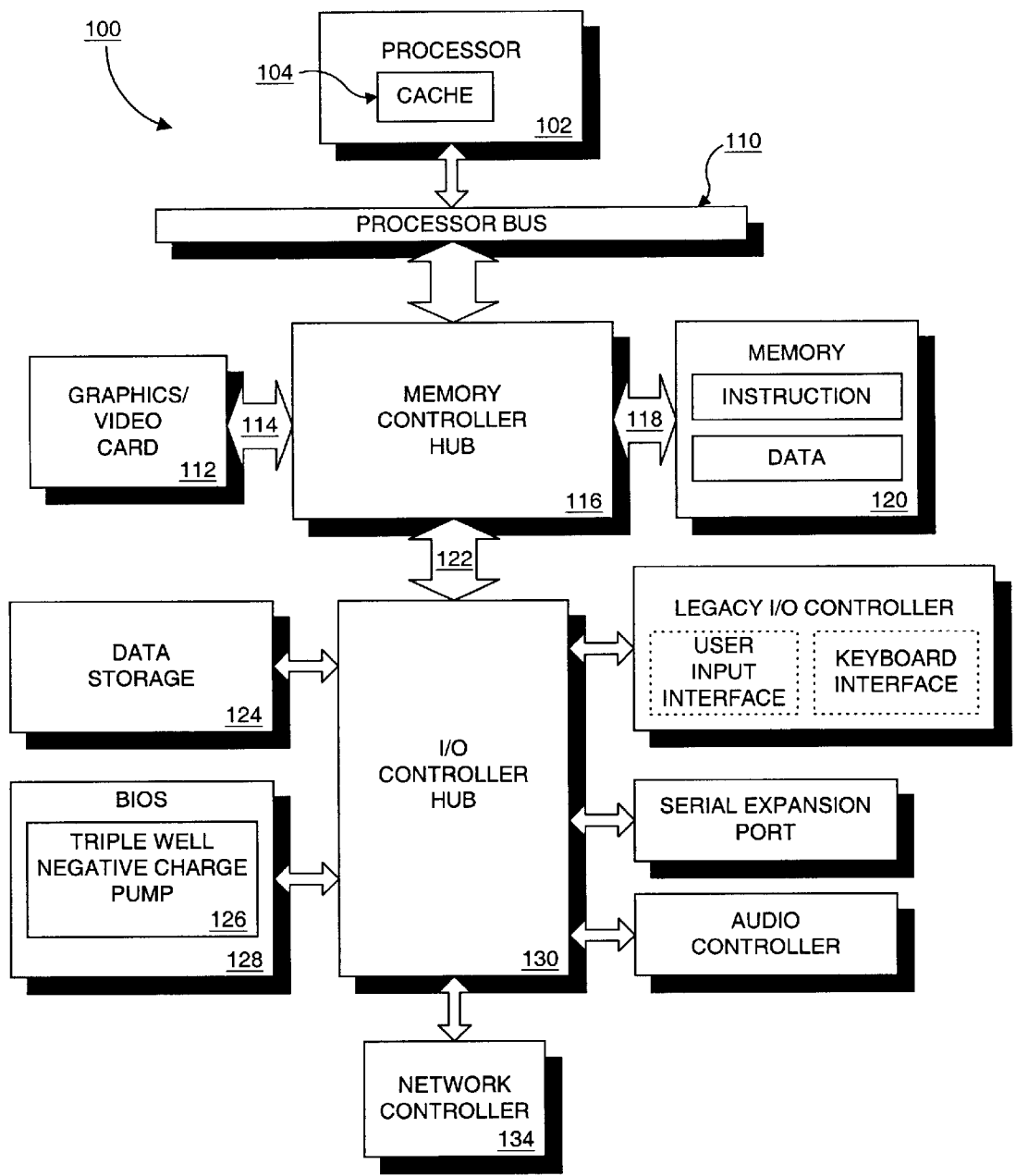
FIG. 1 is one embodiment of a computer system utilizing a triple well no body effect negative charge pump.

Referring now to FIG. 1, an exemplary computer system 100 is shown. System 100 includes a component, such as a processor, employing a triple well no body effect negative charge pump in accordance with the present invention, such as in the embodiment described herein. System 100 is representative of processing systems based on the PENTIUM® Pro, PENTIUM® II, PENTIUM® III, Itanium® microprocessors available from Intel Corporation of Santa Clara, Calif. although other systems (including PCs having other microprocessors, engineering workstations, set-top boxes and the like) may also be used. In one embodiment, sample system 100 may be executing a version of the WINDOWS™ operating system available from Microsoft Corporation of Redmond, Washington, although other operating systems and graphical user interfaces, for example, may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a icrocontroller, a digital signal processor (DSP), system on a chip, network computers (NetPC), set-top boxes, network hubs, wide area network (WAN) switches, or any other system which uses a charge pump for other embodiments.

FIG. 1 is a block diagram of one embodiment of a system 100. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device, a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory may reside external to the processor.

A system logic chip 116 is coupled to the processor bus 110 and memory 120.

The system logic chip 116 in the illustrated embodiment is a memory controller hub (MCII). The processor 102 communicates to the MCH 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, firmware hub (BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

A triple well no body effect negative charge pump 126 also resides in flash memory BIOS 128. Alternate embodiments of a triple well no body effect negative charge pump 106 can also be used in microcontrollers, embedded processors, graphics devices, DSPs, and other types of logic circuits.

For another embodiment of a system, one implementation of a charge pump can be used with a system on a chip. One embodiment of a system on a chip comprises of a processor and a memory. The memory for one system is a flash memory. The flash memory can be located on the same die as the processor and other system components. Additionally, other logic blocks such as a memory controller or graphics controller can also be located on a system on a chip. By including one embodiment of the present invention on the system on a chip, the flash memory can be enabled to program and erase flash memory cells without requiring a high voltage pin on the system on a chip pin-out. The needed high voltage potentials can be generated on the same die.

Figure 2:
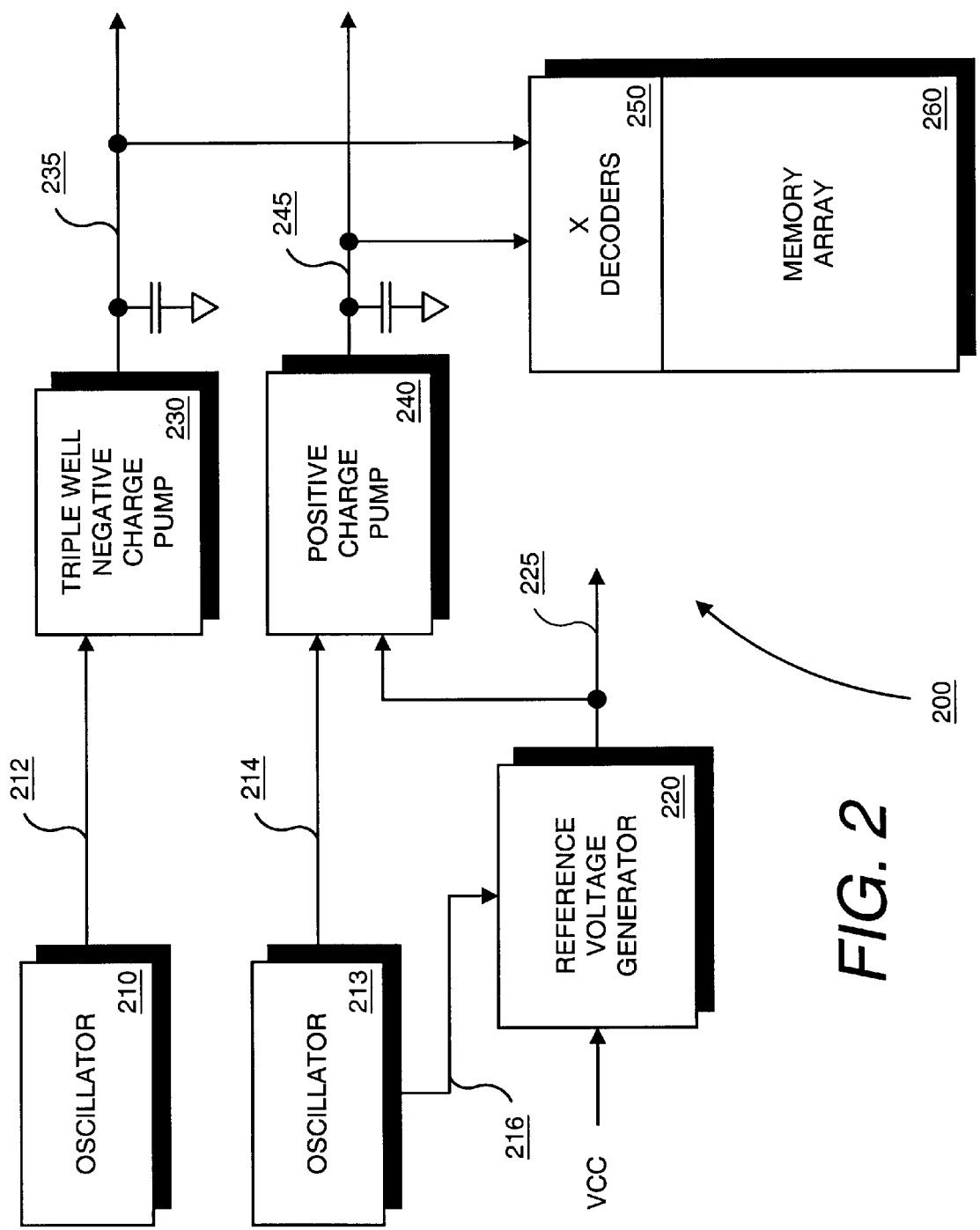
FIG. 2 is a flash memory circuit using a triple well no body effect negative charge pump of one embodiment.

FIG. 2 is a flash memory circuit 200 using a triple well no body effect negative charge pump of one embodiment. Reference generator 220 provides a reference voltage 225 to the positive pump 240. The positive pump 240 provides a regulated voltage of approximately five volts over decoder supply line 245 to the X-decoders 250 of the memory array 260. For one embodiment, the negative charge pump 240 is a triple well no body effect negative charge pump. The negative pump provides a voltage of approximately negative five volts over decoder supply line 235 to the X-decoders of memory array 260. A first oscillator 210 provides a clock signal 212 that periodically pulses or enables the negative pump 230 during a standby mode. A second oscillator 213 provides clock signals 214, 216 that periodically pulse or enable the positive pump 240 and the reference generator 220, respectively, when they are in a standby mode. The clock signals 212, 214, 216 may each have a different frequency.

Figure 3:
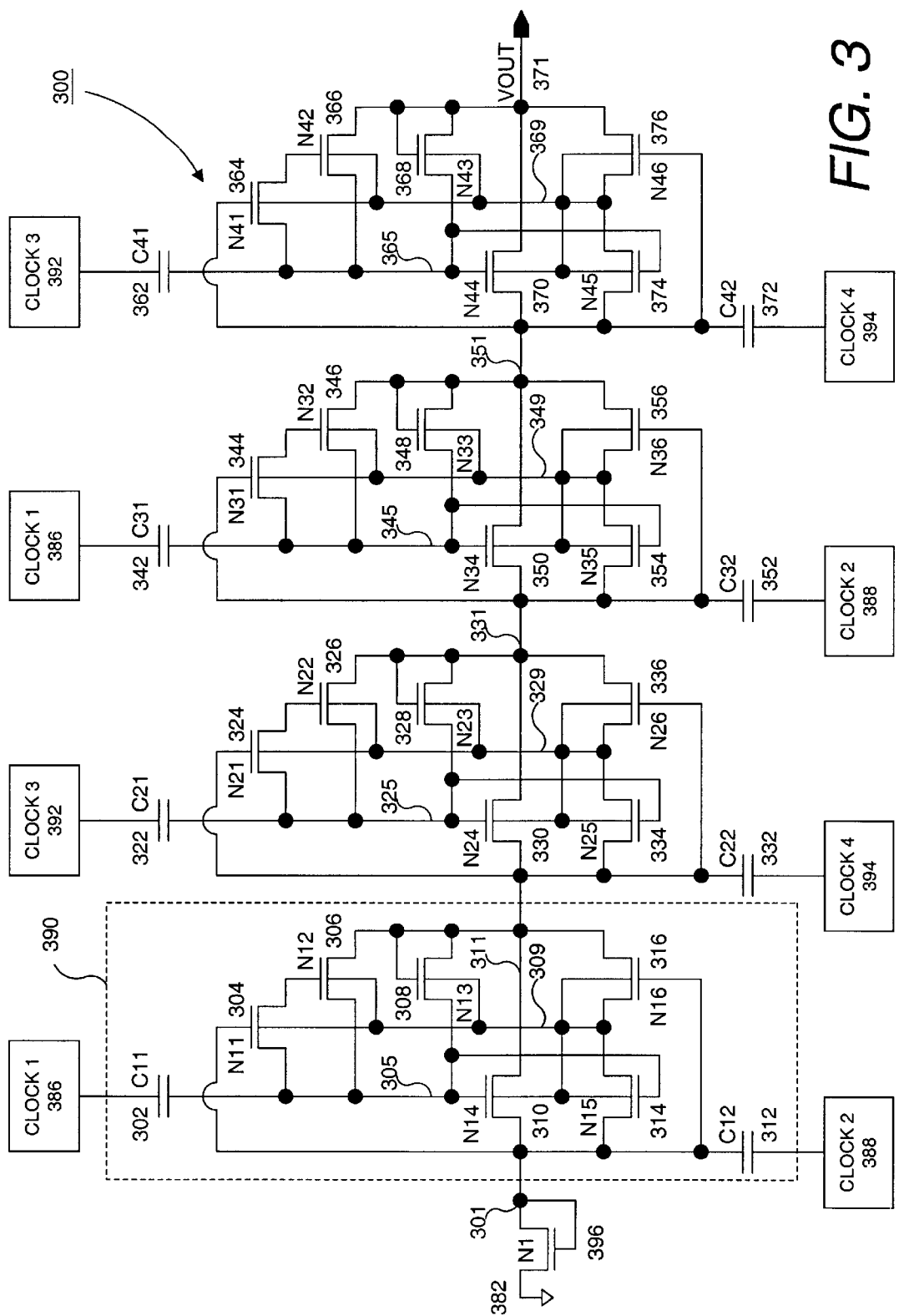
FIG. 3 is a circuit diagram of a four stage triple well no body effect negative charge pump of one embodiment.

FIG. 3 is a simplified circuit diagram of a four stage triple well no body effect negative charge pump architecture of one embodiment. The four state negative charge pump 300 of this embodiment comprises of four pump stages. The embodiment of FIG. 3 includes switching transistors N14 310, N24 330, N34 350, N44 370 connected in series between ground 382 and VOUT 341. The switching transistors N14 310, N24 330, N34 350, N44 370 are preferably triple well N type field effect transistors.

The embodiment of FIG. 3 further includes pull-down transistors N13 308, N23 328, N33 348, N43 368. The pull-down transistors N13 308, N23 328, N33 348, N43 368 are triple well N type field effect transistors in this embodiment. The source terminal of pull-down transistor N13 308, N23 328, N33 348, N43 368 is connected to the gate terminal of switching transistor N14 310, N24 330, N34 350, N44 370, respectively. The pull-down transistors N13 308, N23 328, N33 348, N43 368 are diode connected, with the drain terminal and the gate terminal of each pull-down transistor N13 308, N23 328, N33 348, N43 368 connected to the drain terminal of the respective switching transistor N14 310, N24 330, N34 350, N44 370.

The embodiment of FIG. 3 further includes pull-up transistors N12 306, N22 is 326, N32 346, N42 366. The pull-up transistors N12 306, N22 326, N32 346, N42 366 of this embodiment are triple well N type field effect transistors. The drain terminal of the pull-up transistor N12 306, N22 326, N32 346, N42 366 is connected to the gate terminal of the switching transistor N14 310, N24 330, N34 350, N44 370, respectively. The source terminal of the pull-up transistor N12 306, N22 326, N32 346, N42 366 is connected to the drain terminal of the switching transistor N14 310, N24 330, N34 350, N44 370, respectively. The gate terminal of the pull-up transistor N12 306, N22 326, N32 346, N42 366 is connected to the source terminal of control device Nil 304, N21 324, N31 344, N41 364, respectively.

Some existing charge pumps, such as a charge pump apparatus with diode connected pull-down on boot nodes, have pull-up devices whose gates are connected to the same boot node. In an existing pump scheme, the charge passing device or switching transistor cannot maintain its gate terminal voltage level when its drain terminal voltage drops down during charge transfer. The pull-up diode is gradually turned on in the process. This causes insufficient charge transfer for pump stages that have relatively low threshold voltage switching transistors. One solution is to turn off the pull-up transistor or pull-up diode during charge transfer so that the gate voltage of the switching transistor can be maintained.

For this embodiment of the present invention, a control device serves as a switch between the gate and drain terminals of the pull-up transistor. The control device switches the pull-up transistor from being diode connected or not. Control devices N 1 304, N21 324, N31 344, N41 364 are N type field effect transistors in this embodiment. The drain terminal of control device Nil 304, N21 324, N31 344, N41 364 is connected to the gate terminal of switching transistor N14 310, N24 330, N34 350, N44 370, respectively. The gate terminal of control device Nil 304, N21 324, N31 344, N41 364 is connected to the source terminal of switching transistor N14 310, N24 330, N34 350, N44 370, respectively.

Control devices NI1 304, N21 324, N31 344, N41 364 separate the boot node 305, 325, 345, 365 from the diode connected pull-up device N12 306, N22 326, N32 346, 42 366 respectively. The gate terminal of the triple well N device Ni 1 304, N21 324, N31 344, N41 364 connect to the next higher pump node 301, 311, 331, 351, respectively, and stops the formerly diode connected N12 306, N22 326, N32 346, N42 366 from discharging the boot node 305, 325, 345, 365 while the node is being booted by CLOCK 1 386 or CLOCK 3 392, respectively. By controlling the discharge of boot node 305, 325, 345, 365 through the pull-up device N12 306, N22 326, N32 346, N42 366, respectively, more gate drive is available to the charge transfer device N14 310, N24 330, N34 350, N44 370. Thus more charge can be passed from one pump stage to the next high pump stage.

Also included in the embodiment of FIG. 3 are storage capacitors C12 312, C22 332, C32 352, C42 372. Storage capacitor C12 312 is connected between a CLOCK 2 388 signal and the source terminal of switching transistor N14 310. Storage capacitor C22 332 is connected between a CLOCK 4 392 signal and the source terminal of the switching transistor N24 330. Storage capacitor C32 352 is connected between a CLOCK 2 388 signal and the source terminal of switching transistor N34 350. Storage capacitor C42 372 is connected between a CLOCK 4 392 signal and the source terminal of switching transistor N44 370.

The embodiment of FIG. 3 further includes boot node capacitors Cl1 302, C21 322, C31 342, C41 362. Boot node capacitor Cl I 302 is connected between a CLOCK 1 386 signal and the gate terminal of N14 310. Boot node capacitor C21 322 is connected between a CLOCK 3 392 signal and the gate of N24 330. Boot node capacitor C31 342 is connected between a CLOCK 1 386 signal and the gate of N34 350. Boot node capacitor C41 362 is connected between a CLOCK 3 392 signal and the gate of N44 370. For this embodiment, the clock signals 386, 388, 392, 394 are generated by a four phase clock driver which takes its input from an oscillator circuit as in FIG. 2.

The triple negative well no body effect negative charge pump 300 of this embodiment includes well biasing devices N15 314, N16 316, N25 334, N26 336, N35 354, N36 356, N45 374, N46 376. The well biasing devices switching and initiate the P well potential of the triple well N type devices to eliminate body effect. The P well switching can also prevent P-N junctions from being turned on to induce latch up. For semiconductor process of one embodiment, the $Vt_N$ drop is 0.6 volts versus the $Vt_p$ of 2.2 volts with a 12 volt body effect when outputting −12V. The drain terminals of the well biasing devices in each individual pump stage are tied together with the substrate terminals of the N type devices of that stage. The substrate terminals described in this embodiment are also referred to as the P-well connection of the N type devices.

The drain terminals of N15 314 and N16 316 are coupled together with the substrate terminals of Nil 304, N12 306, N13 308, N14 310, N15 314, and N16 316 in the first pump stage 390. The drain terminals of N25 334 and N26 336 are coupled together with the substrate terminals of N21 324, N22 326, N23 328, N24 330, N25 334, and N26 336 in the second pump stage. The drain terminals of N35 354 and N36 356 are coupled together with the substrate terminals of N31 344, N32 346, N33 348, N34 350, N35 354, and N36 356 in the third pump stage. The drain terminals of N45 374 and N46 376 are coupled together with the substrate terminals of N41 364, N42 366, N43 368, N44 370, N45 374, and N46 376 in the fourth pump stage.

The gate terminal of N15 314, N25 334, N35 354, N45 374 is connected to the gate terminal of switching transistor N14 310, N24 330, N34 350, N44 370, respectively. The gate terminal of N16 316, N26 336, N36 356, N46 376 is connected to the source terminal of switching transistor N14 310, N24 330, N34 350, N44 370, respectively. The source terminal of N15 314, N25 334, N35 354, N45 374 is connected to the source terminal of switching device N14 310, N24 330, N34 350, N44 370, respectively. The source terminal of N16 316, N26 336, N36 356, N46 376 is connected to the drain terminal of switching device N14 310, N24 330, N34 350, N44 370, respectively. The well biasing devices N15 314, N25 334, N35 354, N45 374 and N16 316, N26 336, N36 356, N46 376 alternately switch the potential on the substrates terminals between the lo voltage potential at the drain terminal and that at the source terminal of the respective switching device of that pump stage. Use of a triple well can reduce the stress voltage inside one embodiment of a negative pump cell to −13 volts in comparison with the −16 volt stress of some existing pump cells.

Nodes 301, 311, 331, 351 are shown in FIG. 3. Node 301 is defined by the connection of storage capacitor C12 312, the source terminal of switching transistor N14 310, the gate terminal of control device Nil 304, and the gate and drain terminals of transistor Ni 396. Ground 382 is connected to the source terminal of Ni 396. Node 311 is defined by the connection of C22 332, the source terminal of N24 330, the gate terminal of N21 324, the drain terminal of N14 310, the gate and drain terminals of N13 308, and the source terminal of N12 306. Node 331 is defined by the connection of C32 352, the source terminal of N34 350, the gate terminal of N31 344, the drain terminal of N24 330, the gate and drain terminals of N23 328, and the source terminal of N22 326. Node 351 is defined by the connection of C42 372, the source terminal of N34 350, the gate terminal of N41 364, the drain terminal of N34 350, the gate and drain terminals of N33 348, and the source terminal of N32 346. Node 371 is defined by the connection of the source terminal of N44 370, the gate and drain terminals of N43 368, and the source terminal of N42 366.

Boot nodes 305, 325, 345, 365 are also shown in FIG. 3. Boot node 305 is defined by the connection of the boot capacitor CI1 302, the gate terminal of switching transistor N14 310, the source terminal of pull-down transistor N13 308, the drain terminal of pull-up transistor N12 306, and the drain terminal of control device Ni 1 304. Boot node 325 is defined by the connection of C21 322, the gate terminal of N24 330, the source terminal of N23 328, the drain terminal of N22 326, and the drain terminal of N21 324. Boot node 345 is defined by the connection of C31 342, the gate terminal of N34 350, the source terminal of N33 348, the drain terminal of N32 346, and the drain terminal of N31 344. Boot node 365 is defined by the connection of C41 362, the gate terminal of N44 370, the source terminal of N43 368, the drain terminal of N42 366, and the drain terminal of N41 364.

The embodiment of FIG. 3 includes four negative charge pump stages. One of these stages is labeled as stage 390, and includes the storage capacitor C12 312, the switching transistor N14 310, the pull-down transistor N13 308, the pull-up transistor N12 306, the control device Nil 304, and the boot node capacitor Cli 302. Stage 390 receives its input from ground 386 via diode connected transistor Ni 396. The output of this charge pump embodiment is labeled as VOUT 371. Positive charge is transferred in the direction from node 371 to ground 382.

Although the negative charge pump embodiment of FIG. 3 includes four stages, other numbers of stages are possible. Furthermore, the same techniques and teachings of the present invention can be applied to other applications wherein a negative voltage potential is needed to be generated internally. The present invention can be used in a variety of charge pumps to improve the output current and pumping efficiency. The increased output and efficiency may also lead to die size savings if the pump area of the charge pumps can be reduced as a result. Embodiments of the triple well negative pump architecture of the present invention may also offer power savings over existing pump designs.

Figure 4:
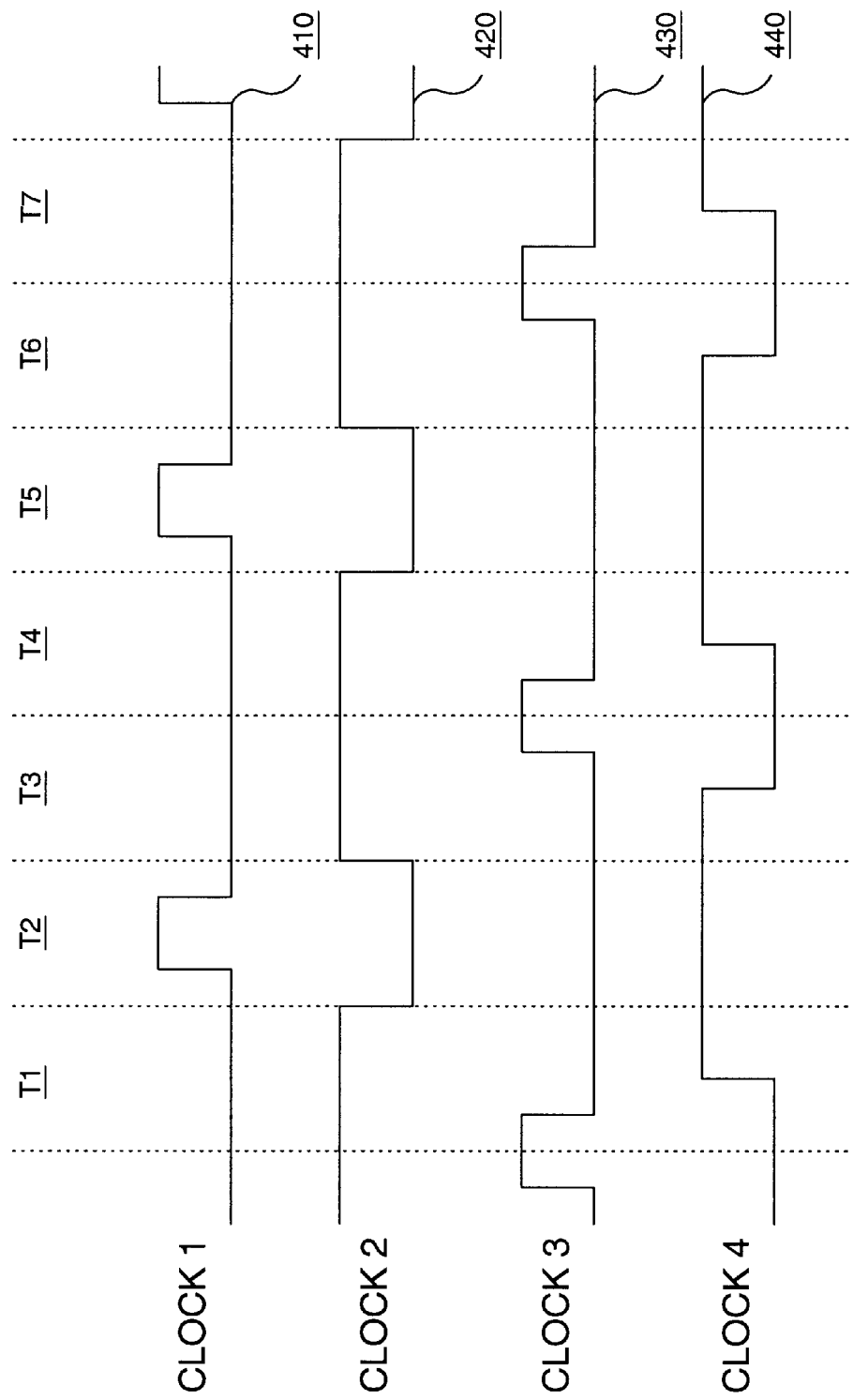
FIG. 4 shows a timing diagram of the pump clocking waveforms used in connection with the negative charge pump of FIG. 3.

FIG. 4 shows a timing diagram of the pump clocking waveforms used in connection with the negative charge pump of FIG. 3. The clock signals CLOCK 1 410, CLOCK 2 420, CLOCK 3 430, CLOCK 4 440 control the operation of this embodiment of a triple well negative charge pump 300. For this embodiment, all of the clock signals 410, 420, 430, 440 are at VCC level when high and at ground potential when low. VCC level varies depending on the particular embodiment and could possibly be 3V, 1.8V, or 1.55V. Unlike other negative charge pumps, an embodiment of the present pump architecture no longer needs to have a positive charge pump to supply the negative pump for boot clocking when operating at a 1.55 volt power supply.

The pumping operation can be abbreviated as the following steps and the repeat of those steps to generate currents. The following discussion will concentrate on the operation of pump 300 beginning with the first low-to-high transition of CLOCK 4 440 at time T1. When CLOCK 4 440 is high, the potential at node 351 is boosted high. The high potential at node 351 pre-charges the boot node 345 of the third stage through N33 348 and turns on N41 364. As N41 364 turns on, N42 366 is activated to discharge boot node 365 of the fourth stage and turn off N44 370 to prevent back conductance between node 351 and node 371. N46 376 is turned on to short P well terminals 369 to node 371, which prevents the P well to N diffusion junctions of the triple well devices N42 366, N43 368, N44 370, N46 376 from turning on. When CLOCK 2 420 transitions low, the voltage potential at node 331 drops low to be ready to receive charge from C42 372 at node 351 and turns off N31 344. When CLOCK 1 410 transitions high, boot node 345 goes high and N34 350 gets turned on. Charge is transferred from C42 372 at node 351 through N34 350 to C32 352 at node 331. The voltage potential at node 351 decreases while the potential at node 331 increases. N35 354 is turned on to short P well terminals 349 to node 331, which prevents the P well to N diffusion junctions of the triple well devices N34 350, N35 354 from turning on. As CLOCK 1 410 transitions back to a logic low, the charge transfer from node 351 to node 331 stops and the voltage level on the nodes level out.

When CLOCK 2 420 goes high, the voltage potential at node 331 also goes high. C21 322 on boot node 325 is pre-charged by C32 352 through N23 328. The high potential on node 331 also turns on N31 344, which activates N32 346 to discharge boot node 345. Discharging boot node 345 turns off N34 350 to prevent back conductance between node 331 and node 351. N36 356 is turned on to short P well terminals 349 to node 331, which prevents the P well to N diffusion junctions of the triple well devices N32 346, N33 348, N34 350, N35 356 from turning on. When CLOCK 4 440 transitions low at time T3, the voltage potential on C22 332 at node 311 drops low in order to be ready to receive charge from C32 352 at node 331. A low on CLOCK 4 440 also turns off N21 324.

As CLOCK 3 430 transitions high during time T3, boot node 325 of the second stage also goes high. A high CLOCK 3 430 turns on switching transistor N24 330. Charge is transferred from C32 352 through N24 330 to C22 332, causing the voltage potential on node 331 to drop and the potential on node 311 to rise. N25 334 is turned on to short P well terminals 329 to node 311, which prevents the P well to N diffusion junctions of the triple well devices N24 330, N25 334 from turning on. When CLOCK 3 430 goes low during time T4, the charge transfer stops. The potentials on node 331 and node 311 level out. The cycle repeats with the low to high transition of CLOCK 4 440 at time T4.

The embodiment of FIG. 3 eliminates of the requirement of overlapping clock periods typically found with prior charge pump circuits. Overlapping clock periods are not required in the embodiment of FIG. 3 because the voltage on the boot nodes 305, 325,345,365 are dependent on the voltages on the nodes 311, 331,351,371, respectively, and not on the voltage present at the prior stage, as is the case with prior pump circuits. The elimination of the overlapping clocks allows for an increase in clock frequency, which improves pump circuit performance.

Although the clocks signals 410,420, 430, 440 of FIG. 4 are shown to overlap, in other words no two clock edges are shown to occur simultaneously, there is no requirement for the clocks to overlap. Clock edges may occur nearly simultaneously, although a small overlap, preferably approximately 2 nanoseconds for one embodiment, may be used in order to account for the non-vertical nature of clock edges.

Figure 5:
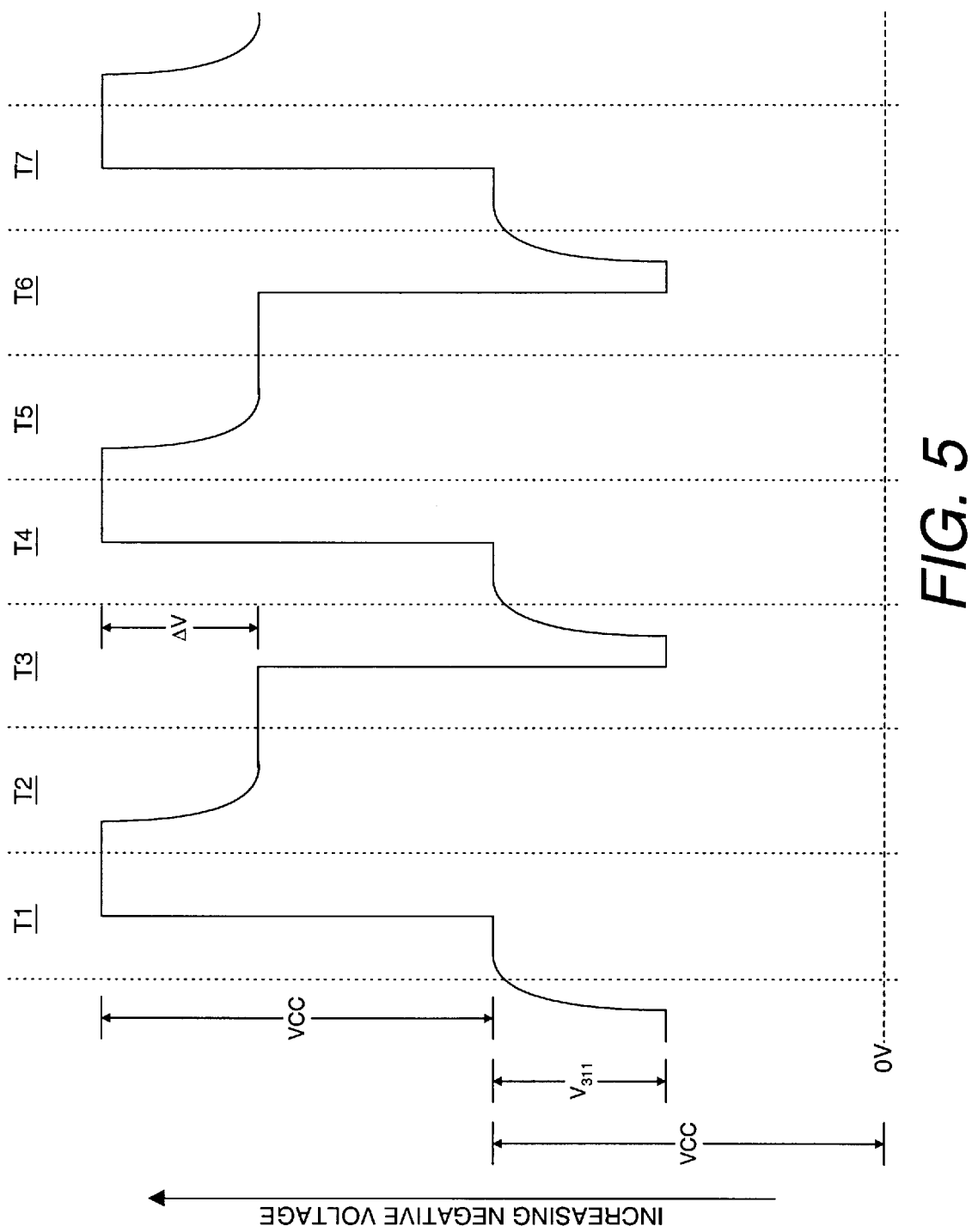
FIG. 5 is a plot of the output of one stage of the negative charge pump embodiment of FIG. 3.

FIG. 5 is a plot of the voltage potential outputted from the fourth stage of the negative charge pump embodiment 300 of FIG. 3. The plot indicates the voltage potential at node 351 during the operation of the pump 300. The resulting output waveform from node 351 corresponds to the operation of pump 300 with the clock signals 410, 420, 430, 440 of FIG. 4. The voltage ramp labeled $V_{351}$ indicates the potential transferred from VOUT 371 to node 351 when N44 370 is turned on by a high CLOCK 3 386. Note that when CLOCK 3 386 is high, node 351 is charged up to a VCC level. As CLOCK 4 388 goes high, node 351 is boosted from a VCC to 2VCC. When CLOCK 1 391 goes high, N34 350 turns on to transfer charge from node 351 to node 331. The voltage drop labeled by ΔV indicates the amount of potential that is transferred from the fourth stage 590 to the third stage. As CLOCK 4 388 goes low, node 351 is no longer boosted and the potential drops back to a low value. The cycle then repeats.

Figure 6:
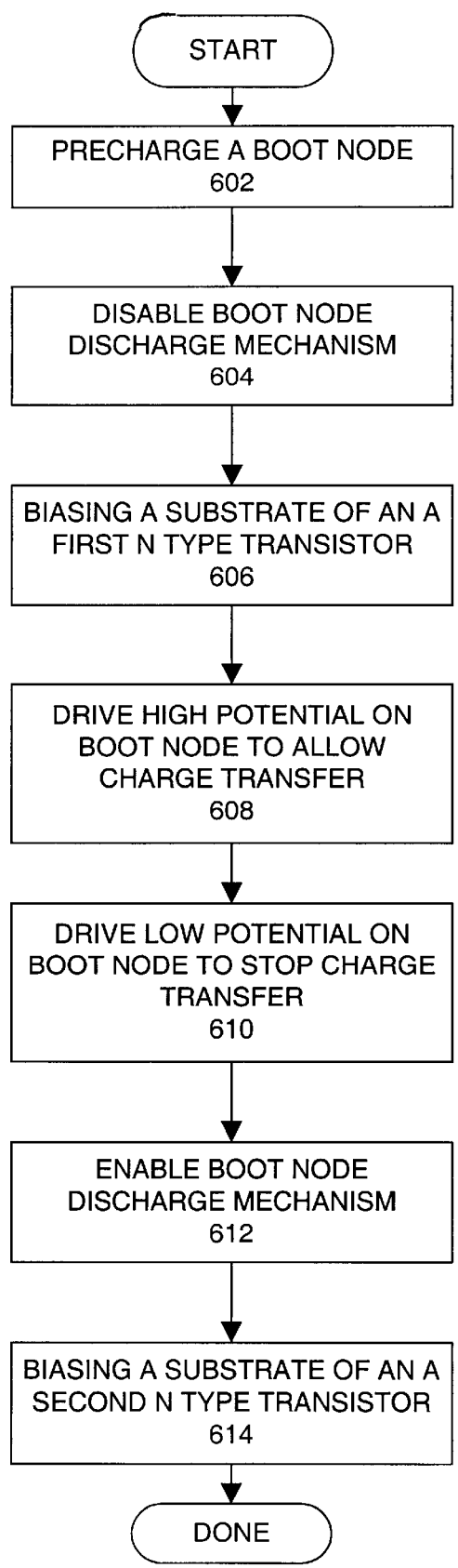
FIG. 6 is a flow diagram illustrating the method of eliminating body effect in a negative charge pump for one embodiment.

FIG. 6 is a flow diagram illustrating the method of eliminating body effect in a negative charge pump for one embodiment. This example generally describes the operation of one negative pump stage. At step 602, a boot node is precharged. The boot node discharge mechanism is disabled at step 604. This discharge mechanism can be viewed as the pull-down device as in the pump cells of FIG. 3. The substrate of one or more of the N type transistor devices in the pump cell is biased at step 606. This biasing prevents the P well to N diffusion junctions in the N type device from turning on during charge transfer. At step 608, a logic high level is driven on the boot node to allow charge transfer to occur. This charge transfer can be related to the charge being passed from a storage capacitor of an earlier stage through a switching device over to a storage capacitor of a subsequent stage. A logic low level is driven on the boot node at step 610 to stop the charge transfer. At step 612, the boot node discharge mechanism is enabled to fully turn off the charge passing device. At step 614, the substrate of one or more of the N type transistor devices in the subsequent pump cell is biased to prevent the P well to N diffusion junctions in those N type devices from turning on during charge transfer in that cell.

The cycle from step 602 to step 614 repeat again and again to continually pass charge from the input of the pump cell to the output of the pump cell. The operation of subsequent pump cells in the charge pump operate in a similar manner, but the clocking are timed differently between adjacent cells in order to properly pump up the voltage.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. An apparatus comprising:
   an N type switching device to transfer negative charge from its source terminal to its drain terminal;
   a boot capacitor coupled to a control terminal of said switching device and forming a boot node between said capacitor and said control terminal, said boot capacitor to increase a voltage on said boot node;
   an N type pull-up device coupled to said switching device, said pull-up device to selectively discharge said boot node;
   an N type control device coupled to said pull-up device, said control device to selectively enable and disable said pull-up device;
   an N type pull-down device coupled to said switch device, said pull-down device to selectively precharge said boot node; and
   a pair of N type well biasing devices coupled to substrate terminals of said switching device, said pull-up device, said control device, and said pull-down device.

2. The apparatus of claim 1 further comprising a storage capacitor coupled to said source terminal of said switching device, said storage capacitor to store charge transferred by said switching device.

3. The apparatus of claim 2 wherein said pair of N type well biasing devices switch a plurality of voltage potentials to substrates of said switching device, said pull-up device, said control device, and said pull-down device.

4. The apparatus of claim 2 wherein substrate terminals of said N type well biasing devices are coupled to said substrate terminals of said switching device, said pull-up device, said control device, and said pull-down device.

5. The apparatus of claim 3 wherein said pair of N type well biasing devices comprise:
   a first N type well bias device comprising a source terminal coupled to said source terminal of said switching device, and a gate terminal coupled to said control terminal of said switching device; and
   a second N type well bias device comprising a source terminal coupled to said drain terminal of said switching device, a gate terminal of said second N type well bias device coupled to said source terminal of said switching device, and said drain terminal of said second N type well bias device coupled to a drain terminal of said first N type well bias device.

6. The apparatus of claim 5 wherein each of said switching device, said pull-up device, said control device, said pull-down device, and said pair of N type well bias devices are formed in a triple well.

7. The apparatus of claim 6 wherein a first clock source is coupled to said storage capacitor.

8. The apparatus of claim 7 wherein a second clock source is coupled to said boot capacitor.

9. The apparatus of claim 8 wherein a said first clock source asserts a first clock signal before said second clock source asserts a second clock signal, said first clock signal to remain asserted until after said second clock signal de-asserts said second clock signal.

10. The apparatus of claim 9 wherein said first and second clock signals are generated by an oscillator.

11. A negative charge pump circuit comprising:
    a first N type transistor;
    a second N type transistor wherein its drain and gate terminals are coupled to a drain terminal of said first transistor, and a source terminal of said second transistor coupled to a gate terminal of said first transistor;
    a third N type transistor wherein its source terminal is coupled to said drain terminal of said first transistor, and a drain terminal of said third transistor is coupled to said gate terminal of said first transistor;
    a fourth N type transistor wherein its drain terminal is coupled to said gate terminal of said first transistor, a source terminal of said fourth transistor coupled to a gate terminal of said third transistor, and a gate terminal of said fourth transistor coupled to said source terminal of said first transistor; and
    a fifth and sixth N type transistors coupled to substrate terminals of said first,: second, third, and fourth transistors, said fifth and sixth transistors to bias a voltage potential on said substrate terminals.

12. The apparatus of claim 11 wherein said fifth N type transistor comprises a source terminal coupled to said source terminal of said first transistor, and a gate terminal coupled of said fifth transistor coupled to said gate terminal of said first transistor.

13. The apparatus of claim 12 wherein said sixth N type transistor comprises a source terminal coupled said drain terminal of said first transistor, a gate terminal of said sixth transistor coupled to said source terminal of said first transistor, and a drain terminal of said sixth transistor coupled to a drain terminal of said fifth transistor.

14. The apparatus of claim 13 wherein said drain terminals of said fifth and sixth transistors are coupled to a substrate terminal of said fifth transistor, a substrate terminal of said sixth transistor and to said substrate terminals of said first, second, third, and fourth transistors.

15. The apparatus of claim 14 wherein said fifth and sixth transistors alternately switch a plurality of voltage potentials from said drain terminal of said first transistor and from said source terminal of said first transistor to said substrate terminals of said first, second, third, fourth, fifth, and sixth transistors.

16. The apparatus of claim 15 wherein said N type transistors are each formed in a triple well.

17. The apparatus of claim 15 further comprising:
a first capacitor coupled between a first clock source and said source terminal of said first transistor;
a second capacitor coupled between a second clock source and said gate terminal of said first transistor.

18. An integrated circuit device comprising:
a triple well negative charge pump of at least two pump cells wherein each cell comprises:
a first transistor;
a first capacitor coupled to a source terminal of said first transistor;
a second capacitor coupled to a gate terminal of said first transistor;
a first diode comprising an input terminal coupled to a drain terminal of said first transistor, and an output terminal coupled to said gate terminal of said first transistor;
a second diode comprising a control terminal coupled to a control device, an input terminal coupled to said gate terminal of said first transistor, and an output terminal coupled to said drain terminal of said first transistor;
a first bias device to couple said source terminal of said first transistor to a substrate terminal of said first transistor, said first diode, said second diode, and said first bias device; and
a second bias device to couple said drain terminal of said first transistor to said substrate terminal of said first transistor, said first diode, said second diode, and said second bias device;
wherein a drain terminal of a first transistor of a first pump cell is coupled to a source terminal of a first transistor of a second pump cell; and
a clock generator to generate clock signals to said first and second capacitors.

19. The integrated circuit device of claim 18 wherein said first diode is a second transistor wherein its drain terminal is coupled to its gate terminal to form said input terminal of said first diode, and wherein a source terminal of said second transistor forms said output terminal of said first diode.

20. The integrated circuit device of claim 19 wherein said second diode is a third transistor wherein its drain terminal forms said input terminal of said second diode, wherein a source terminal of said second transistor forms said output terminal of said second diode, and wherein a gate terminal of said second transistor forms said control terminal.

21. The integrated circuit device of claim 20 wherein said second diode is formed when said control device is activated to electrically couple said drain terminal of said third transistor with said source terminal of said third transistor.

22. The integrated circuit device of claim 20 wherein said control device is a fourth transistor comprising a drain terminal coupled to said control terminal of said second diode, a gate terminal coupled to said source terminal of said first transistor, a source terminal coupled to said gate terminal of said first transistor.

23. The integrated circuit device of claim 22 wherein said first, second, third, fourth transistors, said first bias device, and said second bias device are N type field effect transistors.

24. The integrated circuit device of claim 22 wherein each N type field effect transistor is formed in a triple well.

25. The integrated circuit device of claim 18 wherein said first and second bias devices biases said substrate terminals of said first transistor, said first diode, said second diode, said first bias device, and said second bias device to a plurality of voltage potentials from said drain terminal of said first transistor and said source terminal of said first transistor.

26. A method of operating a negative charge pump comprising:
pre-charging a boot node;
disabling a boot node discharge mechanism;
biasing a substrate of a first N type transistor device coupled to said boot node to a first voltage potential to prevent parasitic P-N junctions from turning on in said first device; and
driving a high potential on said boot node to allow charge transfer.

27. The method of claim 26 further comprising driving a low potential on said boot node to stop charge transfer.

28. The method of claim 27 further comprising enabling said boot node discharge mechanism to discharge said boot node.

29. The method of claim 28 further comprising biasing a substrate of a second N type transistor device coupled to said boot node to a second voltage potential to prevent parasitic P-N junctions from turning on in said device.

* * * * *

UNITED STATES PATENT AND TRADEMARK OFFICE
CERTIFICATE OF CORRECTION

PATENT NO.    : 6,452,438 B1
DATED         : September 17, 2002
INVENTOR(S)   : Li It is certified that error appears in the above-identified patent and that said Letters Patent is hereby corrected as shown below:

Column 4,
Line 66, delete "Nil", insert -- N11 --.

Column 5,
Line 18, delete "N 1", insert -- N11 --.
Line 20, delete "Nil", insert -- N11 --.
Line 23, delete "Nil", insert -- N11 --.
Line 31, delete "Ni 1", insert -- N11 --.
Line 56, delete "C1 I", insert -- C11 --.

Column 6,
Line 49, delete "Nil", insert -- N11 --.
Line 50, delete "Ni", insert -- N1 --.
Line 51, delete "Ni", insert -- N1 --.

Column 7,
Line 4, delete "Ni 1", insert -- N11 --.
Line 19, delete "Nil", insert -- N11 --.
Line 20, delete "Cli", insert -- C11 --.
Line 21, delete "Ni", insert -- N1 --.

Signed and Sealed this

Eighteenth Day of February, 2003

JAMES E. ROGAN
*Director of the United States Patent and Trademark Office*